United States Patent [19]

Marie

[11] 4,228,252
[45] Oct. 14, 1980

[54] PROCESS FOR MAKING ALPHA-OLEFIN POLYMERS OR COPOLYMERS WITH HIGH ISOTACTICITY INDEX

[75] Inventor: Gilbert Marie, Pau, France
[73] Assignee: Ato Chimie, Paris, France
[21] Appl. No.: 48,171
[22] Filed: Jun. 13, 1979
[30] Foreign Application Priority Data
   Jun. 21, 1978 [FR] France .................. 78 18530
[51] Int. Cl.² .......................... C08F 4/16; C08F 4/52
[52] U.S. Cl. .................. 525/247; 252/429 B; 260/33.6 UA; 526/139; 526/140; 526/348; 526 348.2; 526/348.4; 526/351
[58] Field of Search ............... 526/139, 140; 525/247
[56] References Cited
   FOREIGN PATENT DOCUMENTS
   7704845  5/1976 Netherlands .

*Primary Examiner*—Stanford M. Levin
*Attorney, Agent, or Firm*—Burgess, Ryan and Wayne

[57] ABSTRACT

A process for making crystalline polymers or copolymers of alpha-olefins containing 3 to 8 carbon atoms, such as polypropylene, by polymerization with a catalyst consisting of a combination of titanium chloride and an organic aluminum compound, in the presence of a stereospecificity additive.

This stereospecificity additive has the formula:

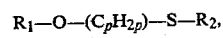

$$R_1-O-(C_pH_{2p})-S-R_2,$$

where:
   $R_1$ and $R_2$ are alkyl radicals containing 1 to 4 carbon atoms or are linked together to form a divalent $-(C_mH_{2m})-$ radical, and
   p and m are integers each with a value of 1 to 6;

this additive may be used in the presence of an activator.

29 Claims, No Drawings

PROCESS FOR MAKING ALPHA-OLEFIN POLYMERS OR COPOLYMERS WITH HIGH ISOTACTICITY INDEX

BACKGROUND OF THE INVENTION

This invention concerns a high-yield process for making alpha-olefin polymers or copolymers with high isotacticity index, by polymerization of an alpha-olefin containing 3 to 8 carbon atoms, sequence copolymerization of such alpha-olefins with one another and/or with ethylene, or copolymerization of mixtures of such alpha-olefins with one another and/or with ethylene, the mixture containing at least 85 and preferably at least 90 mole percent of one of these alpha-olefins, using a modified Ziegler-Natta catalyst consisting of a titanium chloride combined with an organic aluminum compound, and in the presence of a stereospecificity additive.

Polymerization of an alpha-olefin containing 3 or more carbon atoms, such as propylene, using a Ziegler-Natta catalyst consisting of a titanium chloride, such as titanium trichloride, combined with an organic aluminum compound, such as alkyl aluminum and alkyl aluminum chloride, is known to produce a polymerizate containing a polymer fraction with a crystalline structure under X-ray examination, alongside a polymer fraction with an amorphous structure under such examination. The polymer fraction with a crystalline structure, which consists of sterically ordered macromolecular chains, is known as isotactic polymer, while the polymer fraction with an amorphous structure, which consists of sterically disordered macromolecular chains, is known as atactic polymer.

For industrial purposes, isotactic polymers or copolymers of alpha-olefins containing 3 or more carbon atoms are most useful, and attempts have been made to increase the isotactic polymer content of the polymerisate resulting from polymerization or copolymerization of these alpha-olefins, and reduce the atactic polymer content.

One suggested way of doing this is to improve the stereospecificity of the Ziegler-Natta catalyst consisting of a titanium chloride, such as titanium trichloride, and an organic aluminum compound, such as alkyl aluminum or alkyl aluminum chloride, by adding stereospecificity additives to it; this modified catalyst encourages production of a polymerizate made up almost entirely of isotactic polymer.

The many such additives recommended to improve stereospecificity of catalysts consisting of a titanium chloride and an organic aluminum compound include phosphines, such as triphenylphosphine and tributylphosphine, amines, more specifically tertiary-amines such as triethylamine, tributylamine and N,N-dimethylaniline, ethers, for example dialkylethers such as diethylether, dipropylether, or alkylene oxides such as tetrahydrofuran, and thioethers, for example dialkylthioethers and diarylthioethers such as diethylthioether or dipropylthioether, or alkylene thioethers such as tetrahydrothiophene.

But although these stereospecificity additives are effective in the sense that they improve the stereospecificity of the Ziegler-Natta catalyst and provide high-isotacticity polyolefins, in a number of cases they cause a serious reduction in catalyst activity, in other words a drop in the quantity of polymer produced for a given quantity of catalyst. This is a major drawback, seriously affecting the profitability of the polymerization process.

This invention offers a polymerization process of the type described in which particular stereospecificity additives are used to produce polymers or copolymers of alpha-olefins containing 3 to 8 carbon atoms with high isotacticity index, while keeping the catalyst sufficiently active, and in which, in a specially recommended embodiment of the invention, these additives are combined with a compound acting as activator, producing very high yields of high-isotacticity polymer.

This new process to make polymers or copolymers of alpha-olefins containing from 3 to 8 carbon atoms with a high isotacticity index, by polymerization of an alpha-olefin containing 3 to 8 carbon atoms, sequence copolymerization of such alpha-olefins with one another and/or with ethylene, or copolymerization of mixtures of such alpha-olefins with one another and/or with ethylene, such mixtures containing at least 85 mole percent of one such alpha-olefin, using a catalyst consisting of a titanium chloride combined with an organic aluminum compound, in the presence of a stereospecificity additive, is characterized by the fact that this stereospecificity additive is a compound with the general formula:

$$R_1-O-(C_pH_{2p})-S-R_2$$

where:
p is an integer from 1 to 6,
$R_1$ and $R_2$ are identical or different alkyl radicals containing 1 to 4 carbon atoms, or are linked together to form a divalent—$(C_mH_{2m})$—radical,
where: m is an integer from 1 to 6.

Alpha-olefins containing 3 to 8 carbon atoms suitable for such polymerization or copolymerization have the formula:

$$CH_2=CH-R,$$

where: R is an alkyl radical containing 1 to 6 carbon atoms.

Such alpha-olefins comprise propylene, 1-butene, 1-pentene, 4-methyl 1-pentene, and 1-hexene. By means of this new process, high-isotacticity homopolymers may be obtained by polymerizing a single alpha-olefin, or high-isotacticity sequence copolymers by various sequence copolymerization processes to copolymerize one such alpha-olefin with ethylene or at least two such alpha-olefins with or without ethylene, or, finally, high-isotacticity random copolymers by copolymerizing a mixture of one such alpha-olefin with ethylene or a mixture of at least two such alpha-olefins with or without ethylene, provided that the proportion of alpha-olefins containing 3 to 8 carbon atoms or of one such alpha-olefin containing 3 to 8 carbon atoms in the mixture is at least 85 mole percent. High-isotacticity polymers or copolymers obtained by this new process comprise polypropylene, 1-polybutene, 1-polypentene, poly(4-methyl 1-pentene), random copolymers of propylene and ethylene, propylene and 1-butene, propylene and 4-methyl 1-pentene, or propylene and 1-hexene, containing more than 85 mole percent propylene, and sequence copolymers of propylene and ethylene, propylene and 1-butene, or 1-butene and ethylene.

The organic aluminum compound forming one ingredient of the catalyst for this process is preferably a compound with the general formula:

Al Y$_a$ X (3-a), where:
Y is an alkyl radical containing 1 to 8 carbon atoms,
a cycloalkyl radical containing 4 to 8 carbon atoms,
or an aryl radical containing 6 to 8 carbon atoms,
X is a halogen atom, such as a chlorine atom, and a is a number equal to 1, 1.5, 2 or 3.

Recommended compounds of this type are those with the formulae: Al Y$_2$ Cl and Al Y$_3$, where: Y has the meaning already defined, more specifically a phenyl or cyclohexyl radical, or an alkyl radical containing 2 to 6 carbon atoms, such as ethyl, propyl, isopropyl, butyl, isobutyl and hexyl. Such compounds comprise in particular diethylaluminum chloride, dibutyl aluminum chloride, triethyl aluminum, tripropyl aluminum, tributyl aluminum, and tri-isobutyl aluminum.

The titanium chloride combined with the organic aluminum chloride is preferably a titanium trichloride, which may be any titanium trichloride known in the existing art as a component of Ziegler-Natta catalysts. This titanium trichloride may be obtained by the following methods in particular:

reduction of titanium tetrachloride by a metal such as aluminum or titanium, the reduced product possibly being ground;

reduction of titanium tetrachloride by hydrogen;

reduction of titanium tetrachloride by an organo-metallic compound such as alkyl aluminum;

grinding a mixture of titanium trichloride and a halide of a metal in collumn III of the Periodic Table of Elements, such as an aluminum halide.

Titanium trichloride is modified by being treated in the presence of compounds such as tertiary amines, camphor, dialkyl ethers, or phosphorus compounds such as phosphorus oxychloride, are also suitable for use in this new process.

Stereospecificity additives suitable for this new process, and defined by the general formula given above, comprise linear compounds such as:

methylthiomethoxyethane (CH$_3$—S—CH$_2$—CH$_2$—O—CH$_3$),
ethylthiomethoxyethane (C$_2$H$_5$—S—CH$_2$—CH$_2$—O—CH$_3$),
propylthiomethoxyethane (C$_3$H$_7$—S—CH$_2$—CH$_2$—O—CH$_3$),
ethylthioethoxyethane (C$_2$H$_5$—S—CH$_2$—CH$_2$—O—C$_2$H$_5$), or cyclic compounds with the formula:

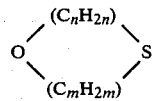

where:
m has the meaning already defined, and
n is an integer, the same as or different from m, and equal in value from 1 to 6,
m and n preferably each being equal in value from 1 to 4.

Such compounds includes:

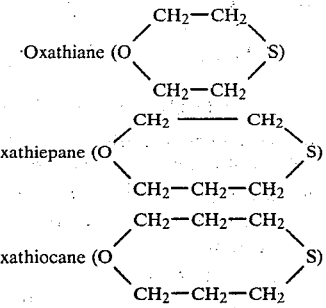

The catalyst may be used without any substrate, or may be deposited on or fixed to an inorganic or organic substrate, for example fixed to an inorganic substrate, such as a metal oxide, carbonate or hydroxychloride like magnesium oxide, magnesium carbonate or magnesium hydroxychloride.

The quantity of stereospecificity additive required is such that the ratio of the number of titanium atoms to the number of additive molecules in the polymerization mixture is between 0.01 and 100, and preferably between 1 and 70.

The proportions of titanium trichloride and organic aluminum compound may vary widely depending on whether or not the catalyst is on a substrate. For example, when a catalyst with substrate is used, the ratio of the number of aluminum atoms to the number of titanium atoms in the polymerization mixture is between 1 and 500, and preferably between 50 and 200. When a catalyst without substrate is used, this ratio is between 1 and 10, and preferably between 2 and 5.

The catalyst may be preformed before being added to the polymerization mixture, but in some cases it may be formed in situ in the polymerization mixture. Whether preformed before addition to the mixture or formed in situ, the whole preformed catalyst or all its components may be added to the polymerization mixture at the beginning of polymerization, or in fractions or continuously throughout polymerization.

There are no special requirements concerning incorporation of the stereospecificity additive in the polymerization mixture, and various methods may be used. For example, when a catalyst consisting of a titanium chloride, such as titanium trichloride, and organic aluminum compound is preformed before injection into the polymerization mixture, the stereospecificity additive may be added to the titanium chloride and organic aluminum compound, by mixing all three components directly or by premixing the additive with one or the other two components and subsequently adding the remaining component, and the resulting mixture injected into the polymerization mixture, or else the stereospecificity additive may be injected into the polymerization mixture first, followed by the titanium chloride and organic aluminum compound mixture.

When the titanium chloride and organic aluminum compound are injected separately into the polymerization mixture to form the catalyst in situ, the stereospecificity additive may either be added separately to the polymerization mixture, or mixed with the titanium chloride or organic aluminum compound before they are injected into the polymerization mixture.

When the additive is premixed with the organic aluminum compound, this is done by placing the additive and compound in solution in an inert solvent, such as a hydrocarbon like heptane. The resulting solution can then easily be injected into the polymerization mixture.

When the additive is to be premixed or made into a composition with the titanium chloride, such as a titanium trichloride, before being added to the polymerization mixture, this is preferably done by techniques such as those summarized below:

- dry grinding together of the additive with titanium trichloride in violet form (obtained by reducing titanium tetrachloride with a metal, such as aluminum) in a ball-mill;
- mixing the additive while being agitated with a titanium trichloride in violet form in a inert diluent, such as a saturated hydrocarbon like heptane, hexane or mineral oil;
- mixing the additive while being agitated with a titanium chloride in beta form (obtained by reducing titanium tetrachloride with an alkyl aluminum) in an inert diluent, such as a saturated hydrocarbon, then, after the diluent has evaporated, collecting the beta titanium trichloride containing the additive using titanium tetrachloride, at 70° to 130° C., to obtain a violet titanium trichloride containing the additive;
- mixing the additive while being agitated with a titanium trichloride in violet form in an inert diluent, such as a saturated hydrocarbon like hexene or heptane, at a temperature of approximately 40° C., then collecting it using titanium tetrachloride in an inert diluent at approximately 65° C.;
- forming a composition by mixing the additive and titanium tetrachloride in given proportions, then grinding this composition together with anhydrous magnesium chloride (as substrate), and finally treating the resulting crushed powder with an alkyl aluminum which may or may not contain a stereospecificity additive, to produce a supported titanium trichloride containing the additive.

Compositions containing a titanium chloride, such as titanium trichloride or titanium tetrachloride, and an additive suitable for use in this new process, such as those obtained by the methods described above, may be prepared just before use, or prepared in advance and stored in the form of suspension in an inert diluent, such as a saturated hydrocarbon like hexane, heptane or mineral oil. These compositions are injected into the polymerization medium in the form of a suspension in an inert diluent such as a saturated hydrocarbon like hexane, heptane or mineral oil.

In one recommended embodiment of the invention, providing higher yields than in the presence of the additive alone, and without reducing the isotacticity index of the polymerization, the polymerization medium may contain one more activators selected from the group comprising acyclic or cyclic polyenes and dihydrocarbylacetylenes in which the hydrocarbyl radicals are selected from aryl radicals containing 6 to 16 and preferably 6 to 8 carbon atoms, and alkyl radicals containing 1 to 16 and preferably 1 to 8 carbon atoms. Compounds functioning as activator, in other words increasing the quantity of polymer produced for a given quantity of catalyst consisting of titanium chloride and organic aluminum compound catalyst, comprise more specifically cyclo-octadiene, 1,3,5-cycloheptatriene, cyclododecatriene, cyclo-octatetraene, 3-methyl 1,4,6-heptatriene, diphenylacetylene, ditolylacetylene, methylphenylacetylene, dimethylacetylene, diethylacetylene, dipropylacetylene, dibutylacetylene, dihexylacetylene and dioctylacetylene.

The proportion of activator in the polymerization mixture can vary quite considerably, but is preferably such that the ratio of the number of titanium atoms to the number of molecules of activator in the polymerization mixture is between 0.01 and 100, and preferably between 1 and 70.

The activator may be added to the polymerization mixture in the same way as the stereospecificity additive, either separately from or mixed with the additive.

Consequently, additive and activator may be injected into the polymerization mixture separately from each other and separately from the catalyst components. Alternatively, the additive may be injected after being mixed with one of the catalyst components, while the activator is injected with the other component, or alone, or the activator is injected after being mixed with one catalyst component, while the additive is injected alone. Additive and activator may also be injected together after being mixed with either catalyst component. For example, additive and activator may be injected together after being mixed with the titanium chloride. In this case the composition or premixture of titanium chloride, additive and activator is preferably prepared by methods similar to those summarized above for premixing of titanium chloride and additive.

In such compositions containing titanium chloride, additive and activator, which may be prepared just before use or made in advance, stored and used in suspension in an inert diluent such as a saturated hydrocarbon like heptane, hexane or mineral oil, as well as in the corresponding preformed compositions already mentioned and not containing any activator, the proportions of titanium compound, additive and possibly activator are preferably such that the respective ratios of the number of titanium atoms to the number of molecules of additive and to the number of molecules of activator are between 0.01 and 100, and preferably between 1 and 70.

In addition, in compositions containing titanium chloride, additives and activator, the relative proportions of additives and activator are preferably such that the ratio of the number of additive molecules to the number of activator molecules is between 0.2 and 5, and preferably between 0.5 and 2.

The relative proportions of additive and activator in the polymerization mixture may also vary quite considerably, but are preferably such that the ratio of the number of additive molecules to the number of activator molecules is between 0.2 and 5, and more specifically between 0.5 and 2.

Polymerization, in other words the process by which the alpha-olefin or alpha-olefins are brought into contact with the catalyst in the presence of the additive and possibly activator to produce polymer or copolymers, may be performed under normal conditions as known in the existing art.

For example, the polymerization temperature may be between 0° and 150° C., and preferably between 40° and 120° C., with absolute pressure ranging from slightly above atmospheric pressure to approximately 100 bars.

Polymerization may be performed either in an inert liquid phase such as an inert hydrocarbon like hexane, heptane or benzene, or using the alpha-olefin or mixture of alpha-olefins to be polymerized, kept in a liquid state, as polymerization mixture, or using a gas phase. When polymerization is done in an inert liquid phase, polymerization pressure is usually less than approximately 15 to 20 bars; on the other hand, when the alpha-olefin or mixture of alpha-olefins to be polymerized is used as polymerization mixture, much higher pressures are applied, so as to keep the alpha-olefin or mixture of alpha-olefins in a liquid phase. For example, when a liquid propylene phase is used, polymerization pressure is usually about 30 bars.

The molecular weights of polymers can be adjusted by using standard transfer agents, such as hydrogen.

When polymerization is completed, the polymerizate is deactivated and separated from the polymerization mixture, and if necessary undergoes additional purification treatment, using any existing techniques. The method described in French patent application No. 76 21 292 (Publication No. 2 358 423) of 12th July 1976, in the applicant's name, may be used for separation and purification of the polymer produced by a propylene polymerization process.

Alpha-olefin polymers and copolymers obtained by means of this new process are characterized by high isotacticity index and high yields.

The isotacticity index of a polymer means the percentage ratio of the weight of solid residue left after extraction of the polymer in n-heptane in a Soxhlet apparatus for 2 hours to the weight of polymer before undergoing this extraction process. The isotacticity index corresponds to the percentage weight of the isotactic fraction of the polymer.

The invention is illustrated by the following examples, without being in any way confined to them.

EXAMPLE 1

This example was carried out for reference. Propylene was polymerized in heptane, using a catalyst consisting of titanium chloride, specifically $TiCl_3\text{-}1/3AlCl_3$, and an organic aluminum compound, specifically diethyl aluminum chloride (DEAC), without any stereospecificity additive, and using either of the following operating procedures.

OPERATING PROCEDURE NO. 1

Polymerization was performed in a 1-liter glass reactor equipped with a rotary agitator and submerged in a thermostatic bath, in order to keep the reactor contents at the right temperature for polymerization. The reactor had first been washed with a solution of DEAC in heptane, then rinsed out with heptane.

An inert atmosphere was created inside the reactor, and a reaction mixture prepared, consisting of dried, degassed heptane, propylene, hydrogen, and the catalyst components, namely DEAC and $TiCl_3\text{-}1/3AlCl_3$, which were injected into the reactor with a syringe, in the form of a DEAC solution and a titanium chloride suspension in sodium-dried and degassed heptane.

The quantities of the different products were such that the reaction mixture had the following properties:

Heptane content . . . 500 ml
Propylene pressure . . . 2.2 kg/cm$^2$
Hydrogen pressure . . . 0.025 kg/cm$^2$
$TiCl_3\text{-}1/3AlCl_3$ content . . . 0.3 g
DEAC/titanium compound molar ratio . . . 2.8

This reaction mixture was kept at 70° C., while being agitated at 625 rpm for 3½ hours.

OPERATING PROCEDURE NO. 2

Polymerization was performed in thick glass 1-liter bottles, which had first been washed with a solution of DEAC in heptane, then rinsed out with heptane.

An inert atmosphere was created inside the bottle, and a reaction mixture prepared, consisting of dried, degassed heptane, propylene, hydrogen, and the catalyst components, DEAC and $TiCl_3\text{-}1/3AlCl_3$, which were injected into the reactor with a syringe, in the form of a DEAC solution and a titanium chloride suspension in a sodium-dried and degassed heptane.

The quantitites of the different products were such that the reaction mixture had the following properties:

Heptane content . . . 500 ml
Propylene pressure . . . 2.2 kg/cm$^2$
$TiCl_3\text{-}1/3AlCl_3$ content . . . 0.3 g
DEAC/titanium compound molar ratio . . . 2.8

The bottles containing the reaction mixture were partly submerged in an oil-bath at suitable temperature and kept on a tray which was being shaken 5 cm back and forwards at a rate of 110 to 115 movements per minute; the contents of the bottles were kept at 70° C. while being shaken in this way for 3½ hours.

In both these operating procedures, when the reaction was completed, any propylene that had not reacted was degassed slowly to flares, and an anti-oxidant solution was injected into the degassed mixture. 5 minutes later 10 cc ethanol was injected and agitation continued for a further 10 minutes.

All polypropylene produced during the polymerization reaction was then collected, by pouring the suspension polypropylene in heptane in the reaction container into a crystallizer. The heptane was evaporated under a hood at atmospheric temperature, then in a vacuum at 60° C. The solid evaporation residue containing the isotactic and atactic fractions of polypropylene was collected and underwent homogenization in a mixer, to produce propylene that would be as homogeneous as possible.

Two types of measurements were made on this homogenized polypropylene: titanium content to show catalyst activity, and isotacticity index.

The titanium content of the polypropylene was measured, after mineralization and calcining, by a colorimetric method. The quantity of $AlCl_3$-free $TiCl_3$ could be worked out from this titanium content, as well as catalyst activity, namely the number of grams of polypropylene produced per gram of $TiCl_3$.

The isotacticity index was measured by means of hollow cartridges of a porous material inert in relation to n-heptane. An empty cartridge was first placed in contact with 99% pure n-heptane in a Soxhlet extraction apparatus for 2 hours. This cartridge was then dried in a vacuum at 50° C., and its weight $W_1$ measured. It was filled with a certain quantity of polypropylene (approximately 10 g) and the combined weight $W_2$ was measured. The full cartridge then underwent extraction with 99% n-heptane in the Soxhlet apparatus for 2 hours, after which it was dried in a vacuum at 50° C. and its weight $W_3$ measured.

The isotacticity index of the polypropylene, namely the ratio, expressed in percentage weight, of solid residue remaining after extraction of propylene with n-heptane in a Soxhlet apparatus for 2 hours to the weight of polypropylene before extraction, corresponding to the percentage weight of the isotactic polymer fraction in the polypropylene, is shown by the formula:

$$(W_3-W_1/W_2-W_1)\times 100$$

For operating procedure No. 1, with a commercial $TiCl_3-1/3AlCl_3$ and DEAC, the titanium compound being used without recrushing, the resulting polypropylene had an isotacticity index of 93 to 93.2, and a melt flow index ($MI_2^{230°\ C.}$) of 2 to 5, while catalyst activity was 290 to 300 (test 101).

In operating procedure No. 2, using the same catalyst components, the titanium compound again being used without regrinding, the resulting polypropylene had an isotacticity index of 91.6 to 91.8, and catalyst activity, was 225 to 235 (test 102).

Using operating procedure No. 2, with the same catalyst components, but with the titanium compound reground, the resulting polypropylene had an isotacticity index of 91.2, and catalyst activity was 180 (test 103).

Melt flow indices ($MI_2^{230}$) in this example and in following examples were measured in accordance with ASTM standard D 1238, at a temperature of 230° C. and under a 2.16 kg load.

EXAMPLE 2

Propylene was polymerized, using operating procedures similar to either of those described in Example 1. Tests 201 to 212 were done using stereo-specificity additives as defined above, and tests 213 to 217 in the presence of compounds of similar structure, used for purposes of comparison.

In each test, catalyst components, namely DEAC and $TiCl_3-1/3AlCl_3$, used without regrinding, and the stereospecificity additive (or product used for comparison) were injected separately and in succession into the reactor, either in the order DEAC, titanium compound, additive (injection sequence No. 1), or in the order DEAC, additive, titanium compound (injection sequence No. 2).

The resulting polypropylene was collected and the catalyst activity and isotacticity index of the polypropylene were measured as described in Example 1.

Table 1 below shows the specific conditions for each test and their results.

The results given in Table I show that when propylene is polymerized by means of a catalyst containing an organic aluminum compound (DEAC in this case) and a titanium halide ($TiCl_3-1/3AlCl_3$ in this case), and in the presence of a stereospecificity additive as defined above, a polypropylene with a much higher isotacticity index is obtained than for polypropylene produced under the same conditions but without stereospecificity additive (compare tests using such an additive 201 and 202 with reference test 101, or tests 203 to 212 with reference test 102). Furthermore, catalyst activity in the presence of these new stereospecificity additives remains much the same as without stereospecificity additive (compare tests 201 and 202 with reference test 101, or tests 203, 204, 207, 211 and 212 with reference test 102), or even increases considerably (compare tests 205, 206, 208, 209 and 210 with reference test 102).

TABLE I

| Test No. | Stereospecificity additive Nature | Ti compound/ additive molar ratio | Injection procedure | Polymerization Operating procedure | Polypropylene Catalyst activity | Isotacticity index | Melt flow index ($MI_2^{230}$) |
|---|---|---|---|---|---|---|---|
| 201 | Oxathiane | 5 | No. 1 | No. 1 | 300 | 96 | 6 |
| 202 | " | 5 | No. 2 | No. 1 | 270 | 96;2–96;4 | 4 |
| 203 | " | 5 | No. 1 | No. 2 | 220 | 96;2 | |
| 204 | " | 7;5 | No. 1 | No. 2 | 240 | 95;8 | |
| 205 | " | 10 | No. 1 | No. 2 | 275 | 93;7 | |
| 206 | " | 20 | No. 1 | No. 2 | 290 | 92;2 | |
| 207 | " | 5 | No. 2 | No. 2 | 230 | 97 | |
| 208 | " | 7;5 | No. 2 | No. 2 | 250 | 96;5 | |
| 209 | " | 10 | No. 2 | No. 2 | 270 | 94 | |
| 210 | " | 20 | No. 2 | No. 2 | 290 | 92;8 | |
| 211 | Methyl thio methoxy- | 5 | No. 2 | No. 2 | 200 | 92;7 | |
| 212 | ethane | 15 | No. 2 | No. 2 | 225 | 94;7 | |
| 213 | Dioxane | 5 | No. 1 | No. 1 | 240 | 89 | 5 |
| 214 | " | 5 | No. 2 | No. 1 | 260 | 91;5 | 5 |
| 215 | p-dithiane | 5 | No. 1 | No. 1 | 50 | 89;5 | |
| 216 | m-dithiane | 5 | No. 2 | No. 1 | 40 | 88 | |
| 217 | dimethylic ethylene glycol thioether* | 5 | No. 1 | No. 1 | 30 | 85 | |
| 101 | None | | | No. 1 | 290–300 | 93 | 2–5 |
| 102 | | | | No. 2 | 225–235 | 91;6 | |

*This compound has the formula $CH_3-S-CH_2-CH_2-S-CH_3$

In addition, in contrast to the satisfactory results obtained when these new stereospecificity additives are employed, use of compounds with similar structures to such additives, such as dioxane, dithiane, or dimethylic ethylene glycol thioether, produces very unsatisfactory results: the isotacticity index of the resulting polypropylene is several points lower than for polypropylene produced under the same conditions but without such compounds (compare tests 213 to 217 with reference test 101); in addition, catalyst activity may be considerably lessened (compare tests 215 to 217 with reference test 101).

EXAMPLE 3

Propylene was polymerized, using a method similar to operating procedure No. 2 described in Example 1. Polymerization was done in the presence of a stereospecificity additve as defined above, in this case oxathiane (for tests 301 and 302), or of a compound of similar structure, in this case p-dithiane, used for purposes of comparison (for test 303).

For each test, the catalyst components, DEAC and $TiCl_3-1/3AlCl_3$, were injected separately into the reactor, and the stereospecificity additive or similar compound was injected after being mixed with the titanium compound. The additive or compound was mixed with the titanium compound by grinding them together dry in agate jars using 20 agate pellets for 1 hour in an inert atmosphere. The resulting crushed mixture of titanium compound and additive or similar compounds was then placed in suspension in heptane before being injected into the reactor.

Table II below shows the specific conditions for each test and their results, together with the result of a reference test using operating procedure No. 2 (test 103).

TABLE II

| Test No. | Stereospecificity additive | | Polypropylene | |
|---|---|---|---|---|
| | Nature | Ti compound/additive molar ratio | Isotacticity index | Catalyst activity |
| 301 | Oxathiane | 15 | 93;1 | 200 |
| 302 | | 30 | 92;9 | 205 |
| 303 | p-dithiane | 15 | 90;4 | 60 |
| 103 | none | | 91;2 | 180 |

Results again show that the new stereospecificity additive raises the isotacticity index of the polypropylene while slightly increasing catalyst activity (compare tests 301 and 302 with reference test 103). On the other hand, use of p-dithiane as an additive reduces the isotacticity index and catalyst activity to one third of its value, in the absence of additive (compare tests 303 and 103).

EXAMPLE 4

Propylene was polymerized using either of the operating procedure described in Example 1. Polymerization was done in the presence of a stereospecificity additive as defined above (tests 401 to 405) or a compound of similar structure used for purposes of comparison (tests 406 and 407).

For each test, the catalyst components, DEAC and $TiCl_3-1/3AlCl_3$, were injected separately into the reactor, and the stereospecificity additive or similar compound was injected after being mixed with the titanium compound. The additive or compound for comparison was agitated with the titanium compound in a suitable volume of heptane for long enough to produce a homogeneous suspension for injection into the reactor by syringe.

Table III below shows the specific conditions for each test and their results, together with results of reference tests 101 and 102.

These results show that the use of stereospecificity additives as defined above considerably raises the isotacticity index of the polypropylene produced, while increasing catalyst activity (compare tests 401 to 403 with reference test 101, and tests 404 and 405 with reference test 102). On the other hand, use of dithiepane or m-dithiane as additive markedly reduces the isotacticity index and catalyst activity (compare test 407 with reference test 101 and test 406 with reference test 102).

EXAMPLE 5

Propylene was polymerized using a method similar to operating procedure No. 1 in Example 1, except that the pressure of propylene was increased to give a total pressure of 6 kg/cm$^2$ inside the reactor, and polymerization was performed in the presence of oxathiane, injected into the reactor in a special mixture with the titanium compound, in the form of a suspension in heptane.

This special mixture of titanium compound and oxathiane was prepared by suspending the titanium compound ($TiCl_3-1/3AlCl_3$) in heptane and adding oxathiane. The resulting suspension was then agitated for 1 hour at 40° C., after which the solid part of the suspension was separated from the liquid phase, washed five times in dry heptane, and dried with nitrogen. The resulting solid was then suspended in a 40% volume solution of $TiCl_4$ in heptane, and this suspension was agitated for 2 hours at 65° C. The liquid phase was then removed from the suspension and the solid residue was washed five times in heptane and dried with pure dry nitrogen.

The resulting solid contained $TiCl_3$, $AlCl_3$ and oxathiane, with a molar ratio of $TiCl_3$ to oxathiane of 10.

A suitable quantity of this solid, corresponding to 0.3 g $TiCl_3-1/3AlCl_3$, was suspended in sodium-dried degassed heptane, and the resulting suspension formed the special titanium compound and oxathiane mixture injected in to the reactor.

Polypropylene produced by this polymerization test had an isotacticity index of 95.8, while catalyst activity was 340.

EXAMPLE 6

Propylene was polymerized, using methods similar to either of the operating procedures described in Example 1. Polymerization was performed in the presence of stereospecificity additives as defined above (tests 601 to 608), or compounds of similar structure used for purposes of comparison (tests 609 to 611).

For each test, the catalyst components, DEAC and $TiCl_3-1/3AlCl_3$ were injected separately into the reaction container, and the stereospecificity additive or compound for comparison was injected after being mixed with DEAC. This was done by adding the additive or compound into the heptane used to make the DEAC solution injected into the reactor.

Table IV below the specific conditions for each test and their results, together with results of reference tests 101 and 102.

Once again, these results show that the use of stereospecificity additives as defined above considerably

TABLE III

| Test No. | Stereospecificity additive | | Polymerization Operating procedure | Polypropylene | | |
|---|---|---|---|---|---|---|
| | Nature | Ti compound/ additive molar ratio | | Catalyst activity | Isotacticity index | Melt flow index (MI$_2^{230}$) |
| 401 | oxathiane | 5 | No. 1 | 305 | 95;8 | 3 |
| 402 | 1,4-oxathiepane | 15 | No. 1 | 320 | 96;2 | 0;9 |
| 403 | 1,4-oxathiepane | 30 | No. 1 | 340 | 96;5 | 0;5 |
| 404 | oxathiane | 30 | No. 2 | 240 | 93 | |
| 405 | 1,4-oxathiepane | 30 | No. 2 | 250 | 94;7 | |
| 406 | dithiepane | 5 | No. 2 | 55 | 88 | |
| 407 | m-dithiane | 5 | No. 1 | 40 | 89 | |
| 101 | none | | No. 1 | 290-300 | 93 | 2-5 |
| 102 | none | | No. 2 | 225-235 | 91;6 | | raises the isotacticity index of the polypropylene (compare tests 601 to 603 with reference test 101, and tests 604 to 608 with reference test 102), without loss of catalyst activity (compare tests 606 to 608 with reference test 102), or even a slight increase in such activity (compare tests 601 to 603 with reference test 101, or tests 604, 605 and 607 with reference test 102).

On the other hand, when the compounds for comparison are used, the isotacticity index of the polypropylene is almost the same as for polypropylene in the reference test, in the case of tetrahydrothiophene or dimethylic ethylene glycol ether (compare tests 610 and 611 with reference test 102), or is slightly lower in the case of thiourea (compare test 609 with reference test 101).

crushing additive, activator and titanium compound together dry and placing the resulting product in suspension in heptane;

C—injected together with the titanium compound in the form of a suspension in heptane, obtained by dispersing additive, activator and titanium compound in heptane while being agitated;

D—injected together with DEAC in the form of a solution in heptane;

E—injected together in the form of a special mixture with the titanium compound, prepared in the way described in Example 5 except that the additive was replaced by the additive and activator mixture, this special mixture being suspended in heptane;

F—activator injected separately from DEAC and titanium compound, and additive contained in the solution of DEAC in heptane;

G—activator mixed with the titanium compound, by suspending the titanium compound in heptane containing the activator, and additive contained in the solution of DEAC in heptane;

H—activator contained in the solution of DEAC in heptane, and additive in the suspension of titanium compound in heptane, prepared by suspending the titanium compound in the heptane containing the additive.

Table V below shows the specific conditions for each test and their results.

Some of these tests were repeated under similar conditions, except that activator was used without stereospecificity additive, or stereospecificity additive without activator. Injection procedures A' to D' were used, similar to procedures A to D above, except that the activator/additive combination was replaced by activator alone or additive alone.

Table VI below shows the specific conditions for each test and their results, together with results of reference test 101 to 103.

TABLE IV

| Test No. | Stereospecificity additive Nature | Ti compound/ additive molar ratio | Polymerization Operating procedure | Polypropylene Catalyst activity | Isotacticity index | Melt flow index $(MI_2^{230})$ |
|---|---|---|---|---|---|---|
| 601 | Oxathiane | 15 | No. 1 | 320 | 95;8 | 2;7 |
| 602 | Oxathiane | 30 | No. 1 | 335 | 95;2 | 6 |
| 603 | Oxathiane | 30 | No. 1 | 345 | 96;4 | 0;7 |
| 604 | Oxathiane | 4 | No. 2 | 260 | 95;4 | |
| 605 | Oxathiepane | 30 | No. 2 | 255 | 94;7 | |
| 606 | Methylthiomethoxyethane | 15 | No. 2 | 240 | 94;8 | |
| 607 | Methylthiomethoxyethane | 30 | No. 2 | 250 | 94;2 | |
| 608 | Ethylthiomethoxyethane | 30 | No. 2 | 235 | 95 | |
| 609 | Thiourea | 15 | No. 1 | 220 | 91;8 | 2;5 |
| 610 | Tetrahydrothiophene | 15 | No. 2 | 90 | 91;8 | |
| 611 | $CH_3$—O—$CH_2$—$CH_2$—O—$CH_3$* | 15 | No. 2 | 225 | 92 | |
| 101 | None | | No. 1 | 290–300 | 93 | 2–5 |
| 102 | None | | No. 2 | 225–235 | 91;6 | |

*dimethylic ethylene glycol ether

In addition, catalyst activity, which is almost the same as for the reference test in the case of dimethylic ethylene glycol ether (compare test 611 with reference test 102), is much less in the case of thiourea (compare test 609 with reference test 101) or tetrahydrothiophene (compare test 610 with reference test 102).

EXAMPLE 7

Propylene was polymerized using methods similar to either of the operating procedures described in Example 1. Polymerization was performed in the presence of stereospecificity additives and activators as defined above, used together.

For each test, the catalyst components, DEAC and $TiCl_3$—1/3$AlCl_3$, were injected separately into the reaction container in the form of a DEAC solution or titanium compound suspension in heptane, while the additive and activator were added as follows:

A—injected into the reaction container separately from each other and separately from catalyst components;

B—injected together with the titanium compound in the form of a suspension in heptane, obtained by

TABLE V

| Test No. | Stereospecificity additive Nature | Ti compound/ additive molar ratio | Activator Nature | Ti compound/ activator molar ratio | Injection procedure | Operating procedure | Polypropylene Catalyst activity | Isotacticity index | Melt flow index $(MI_2^{230})$ |
|---|---|---|---|---|---|---|---|---|---|
| 701 | Oxathiane | 5 | DPA (a) | 5 | A | No.1 | 330 | 95;8 | 4;2 |
| 702 | Oxathiane | 5 | CDT (b) | 5 | A | No.1 | 340 | 96;2 | 5 |
| 703 | Oxathiane | 30 | DPA | 30 | B | No.2 | 230 | 93;2 | |
| 704 | Oxathiane | 30 | CDT | 30 | B | No.2 | 240 | 93;4 | |
| 705 | Oxathiane | 5 | CDT | 5 | C | No.1 | 320 | 95;7 | 4 |
| 706 | Oxathiepane | 30 | DPA | 30 | C | No.1 | 370 | 96;4 | 1 |
| 707 | Oxathiane | 30 | DPA | 30 | C | No.2 | 280 | 92;8 | |

TABLE V-continued

| Test No. | Stereospecificity additive Nature | Ti compound/ additive molar ratio | Activator Nature | Ti compound/ activator molar ratio | Injection procedure | Operating procedure | Catalyst activity | Isotacticity index | Melt flow index (MI$_2^{230}$) |
|---|---|---|---|---|---|---|---|---|---|
| 708 | Oxathiane | 15 | DPA | 15 | D | No.1 | 380 | 95;7 | 3 |
| 709 | Oxathiane | 15 | CDT | 15 | D | No.1 | 400 | 95;8 | 4;5 |
| 710 | Oxathiane | 30 | DPA | 30 | D | No.1 | 370 | 95;8 | 3;2 |
| 711 | Oxathiane | 60 | CDT | 60 | D | No.1 | 375 | 94;9 | 3;5 |
| 712 | Oxathiepane | 30 | DPA | 30 | D | No.1 | 380 | 96;1 | 1;2 |
| 713 | MTM (c) | 15 | DPA | 15 | D | No.2 | 270 | 94;7 | |
| 714 | MTM | 30 | DPA | 30 | D | No.2 | 280 | 94;3 | |
| 715 | MTM | 60 | DPA | 60 | D | No.2 | 300 | 93;6 | |
| 716 | MTM | 30 | CDT | 30 | D | No.2 | 290 | 94;2 | |
| 717 | MTM | 60 | CDT | 60 | D | No.2 | 315 | 93;7 | |
| 718 | ETM (d) | 60 | DPA | 60 | D | No.2 | 250 | 94;8 | |
| 719 | Oxathiane | 10 | DPA | 10 | E | No.1 (e) | 395 | 95;9 | |
| 720 | Oxathiane | 15 | CPA | 15 | F | No.1 | 360 | 95;6 | 3;2 |
| 721 | Oxathiane | 30 | CDT | 30 | G | No.2 | 255 | 93;2 | |
| 722 | Oxathiane | 30 | DPA | 30 | H | No.2 | 270 | 92;9 | |

(a) Diphenylacetylene
(b) Cyclododecatriene
(c) Methylthiomethoxyethane
(d) Ethylthiomethoxyethane
(e) Operating procedure No.1 under pressure conditions defined in Example 5.

TABLE VI

| Test No. | Stereospecificity additive Nature | Ti compound/ additive molar ratio | Activator Nature | Ti compound/ activator molar ratio | Injection procedure | Operating procedure | Catalyst activity | Isotacticity index | Melt flow index (MI$_2^{230}$) |
|---|---|---|---|---|---|---|---|---|---|
| 723 | | | DPA | 5 | A' | No.1 | 320 | 91;5 | 5 |
| 724 | | | CDT | 5 | A' | No.1 | 340 | 92;5 | 3 |
| 725 | | | DPA | 30 | B' | No.2 | 220 | 90;9 | |
| 726 | | | CDT | 30 | B' | No.2 | 225 | 91;1 | |
| 727 | | | DPA | 30 | C' | No.1 | 310 | 93;2 | 3 |
| 728 | | | CDT | 30 | C' | No.1 | 320 | 93;3 | 2 |
| 729 | | | DPA | 30 | C' | No.2 | 250 | 90;8 | |
| 730 | | | CDT | 30 | C' | No.2 | 250 | 91 | |
| 731 | | | DPA | 30 | D' | No.1 | 310 | 93 | 3 |
| 732 | | | CDT | 30 | D' | No.1 | 320 | 93;1 | 3 |
| 733 | | | DPA | 30 | D' | No.2 | 260 | 91;7 | |
| 734 | | | CDT | 30 | D' | No.2 | 275 | 91;8 | |
| 735 | Oxathiane | 5 | | | A' | No.1 | 300 | 96 | 6 |
| 736 | Oxathiane | 30 | | | B' | No.2 | 205 | 92;9 | |
| 737 | Oxathiepane | 30 | | | C' | No.1 | 340 | 96;5 | 0;5 |
| 738 | Oxathiane | 30 | | | C' | No.2 | 240 | 93 | |
| 739 | Oxathiane | 30 | | | D' | No.1 | 335 | 95;2 | 6 |
| 740 | MTM | 30 | | | D' | No.2 | 250 | 94;2 | |
| 101 | | | | | | No.1 | 290–300 | 93 | 2–5 |
| 102 | | | | | | No.2 | 225–235 | 91;6 | |
| 103 | | | | | | No.2* | 180 | 91;2 | |

*Titanium compound dry-ground before being suspended in heptane.

The results given in Tables V and VI, when compared, show that combined use of a steroespecificity additive and activator as defined above has a synergistic effect, producing much higher catalyst activity than could be expected from the results of use of additive alone and activator alone, and without reducing the isotacticity index of polypropylene using additive alone (compare test 701 with tests 735 and 723, test 704 with tests 736 and 726, test 706 with tests 737 and 727, test 710 with tests 739 and 731, and test 716 with tests 740 and 734).

This combination of stereospecificity additive and activator as defined above, by producing a much higher lever of catalyst activity, further improves the excellent effect on the isotacticity index of polypropylene of use of stereospecificity additive alone.

EXAMPLE 8

In the four tests described below, propylene was polymerized, using a catalyst supported on a substrate, and a stereospecificity additive as defined above, in this case oxathiane.

6.64 g anhydrous MgCl$_2$, and 0.59 g of a complex containing TiCl$_4$ and oxathiane with a molar ratio of TiCl$_4$ to oxathiane of 1, were ground in an inert atmosphere for 18 hours, in an agate grinder containing 70 g agate pellets. The ground product contained 1.33% weight of titanium.

Test 801

0.75 g of the crushed product was added to a solution of 2.736 g triethyl aluminum and 0.78 g oxathiane in 40 cc anhydrous n-heptane. The resulting catalyst suspension was injected under dry argon pressure into a 3-liter glass autoclave equipped with an agitator and heat-controlled to 65° C., and containing 1.5-liter anhydrous n-heptane. Enough propylene was then injected into the autoclave to produce a pressure of 5 bars, which was maintained throughout the reaction period by further injection of propylene.

After 2 hours' reaction and propylene degassing, the resulting polypropylene was removed from the autoclave and dried. This produced 460 g dried polypropylene, giving a yield of 46 100 g polymer per gram of titanium. The polypropylene had an isotacticity index of 91.5.

Polypropylene produced in the same way but without oxathiane had an isotacticity index of 87.5.

Test 802

0.25 g of the ground product defined above was added to a solution of 1.584 g tri-isobutyl aluminum in 15 cc anhydrous n-heptane. The resulting catalyst suspension was injected under dry argon pressure into a 5-liter vitrified steel autoclave equipped with an agitator and heat-controlled 67° C., and containing 1 650 g anhydrous propylene. Hydrogen was used as transfer agent.

4 hours' reaction produced 740 g polypropylene, corresponding to a yield of 222 500 g polymer per gram of titanium. The polypropylene had an isotacticity index of 92.7.

Polypropylene produced under similar conditions but without oxathiane had an isotacticity index of 89.

Test 803

The same procedure was followed as in Example 802, except that the catalyst suspension was obtained by adding 0.25 g of the crushed product to a solution of 1.584 g tri-isobutyl aluminum and 0.0832 g oxathiane in 15 cc anhydrous n-heptane.

This produced 690 g polypropylene, corresponding to a yield of 207 500 g polymer per gram of titanium. The polypropylene had an isotacticity index of 92.9.

Test 804

The same procedure was followed as for test 802, except that the catalyst suspension was obtained by adding 0.25 g of the crushed product to a solution of 1.584 tri-isobutyl aluminum and 0.1088 g methyl benzoate in 15 cc anhydrous n-heptane.

This produced 730 g polypropylene, corresponding to a yield of 219 500 g polymer per gram of titanium. The polypropylene had an isotacticity index of 92.8.

EXAMPLE 9

In the series of tests (901 to 904) described below propylene was polymerized continuously under high pressure (approximately 29 bars) in a liquid propylene phase.

The catalyst components, DEAC in a 50% weight solution in n-heptane and $TiCl_3$-1/3$AlCl_3$ in a 50% weight suspension in mineral oil, were injected continuously by means of separate syringe pumps into a 5-liter reactor, supplied with liquid propylene through a pump. The reactor was emptied through a pneumatic valve operated by a delayed-action relay system. Polymerization was performed at a temperature of 67° C., using hydrogen as molecular weight regulator. The reaction mixture remained in the reactor for 1½ hour. DEAC and the titanium compound were injected into the reactor at hourly rates giving a weight ratio of DEAC to $TiCl_3$ of 2. The polypropylene was collected on a filter, and various measurements were made on this non-purified product, including the isotacticity index.

In tests 901 to 903, polymerization was done with the combined use of a stereospecificity additive and activator as defined above, in this case oxathiane and diphenylacetylene, injected into the reactor after being mixed with the titanium compound suspended in n-heptane, while reference test 904 was done without stereospecificity additive or activator.

Table VII below shows the specific conditions for each test and their results.

EXAMPLE 10

In the series of tests (1 001 to 1 003) described below, propylene was polymerized with a small quantity of ethylene, operating continuously at a high pressure (approximately 30 bars), in a liquid propylene phase.

Conditions were the same as those for the tests in Example 9, except that, in addition to propylene, ethylene was injected continuously into the reactor in a quantity designed to produce a crystalline random propylene and ethylene copolymer containing approximately 2.5 to 4% weight of ethylene.

In tests 1 001 and 1 002, copolymerization was done with the combined use of a stereospecificity additive and activator, in this case oxathiane and diphenylacetylene, injected together with the titanium compound in the form as a suspension in mineral oil, prepared by method C in Example 7, while reference test 1 003 was done without stereospecificity additive or activator.

Table VIII below shows the specific conditions for each test and their results.

TABLE VII

| Test No. | Ti compound/ additive molar ratio | Ti compound/ activator molar ratio | Rate of Injection $TiCl_3$ (g/hr) | Rate of Injection DEAC (g/hr) | Length of reaction (hours) | Polypropylene Yield* | Polypropylene Isotacticity index | Polypropylene Melt flow index ($MI_2^{230}$) |
|---|---|---|---|---|---|---|---|---|
| 901 | 23 | 23 | 0;60 | 1;2 | 3 | 1020 | 91;9–92;2 | 2–5 |
| 902 | 30 | 30 | 0;75 | 1;5 | 7 | 970–990 | 93–94;5 | 4–5 |
| 903 | 60 | 60 | 0;70 | 1;4 | 5 | 1000 | 92–92;5 | 21 |
| 904 |  |  | 0;60 | 1;2 | 3 | 800 | 88–89 | 2–5 |

*Yield is defined as the number of grams of polypropylene produced per gram of titanium compound ($TiCl_3$—⅓$AlCl_3$)

TABLE VIII

| Test No. | Ti compound/ additive molar ratio | Ti compound/ activator molar ratio | Rate of Injection $TiCl_3$ (g/hr) | Rate of Injection DEAC (g/hr) | Length of reaction (hours) | Copolymer Yield | Copolymer Isotacticity index | Copolymer Melt flow index ($MI_2^{230}$) | Ethylene content (% weight) |
|---|---|---|---|---|---|---|---|---|---|
| 1001 | 30 | 30 | 0;7 | 1;4 | 7 | 850–900 | 89–91 | 2 | 2;4–2;6 |
| 1002 | 30 | 30 | 0;7 | 1;4 | 7 | 915 | 87 | 9 | 3;95 |

TABLE VIII-continued

| Test No. | Ti compound/ additive molar ratio | Ti compound/ activator molar ratio | Rate of Injection TiCl₃ (g/hr) | Rate of Injection DEAC (g/hr) | Length of reaction (hours) | Copolymer Yield | Copolymer Isotacticity index | Copolymer Melt flow index (MI₂²³⁰) | Copolymer Ethylene content (% weight) |
|---|---|---|---|---|---|---|---|---|---|
| 1003 | | | 0;7 | 1;4 | 6,5 | 750–800 | 85–88 | 2 | 2;3–2;6 |

EXAMPLE 11

4-methyl 1-pentene was polymerized, using a method similar to operating procedure No. 2 in Example 1. Polymerization was performed at a temperature of 60° C. and nitrogen pressure of 2.2 kg/cm², and with a stereospecificity additive, in this case oxathiane, injected into the reaction container after being mixed with the titanium compound in the form of a suspension in heptane, prepared by method C' in Example 7. The molar ratio of titanium compound to oxathiane was 15, and 66 g 4-methyl 1-pentene was placed in the reactor.

This produced 34 g poly (4-methyl 1-pentene), with an ether extraction residue of 87.8% and n-heptane extraction residue of 78.1%.

The same reaction, without stereospecificity additive, produced 36 g poly (4-methyl 1pentene), with an ether extraction residue of 82.8% and n-heptane extraction residue of 66.2%.

EXAMPLE 12

A crystalline copolymer of propylene and 4-methyl 1-pentene was prepared, using a method similar to operating procedure No. 2 in Example 1. Polymerization was performed at 60° C. 25 g 4-methyl 1-pentene was placed in the reaction container, while enough propylene was injected to produce a propylene pressure of 2.4 kg/cm² inside the reactor. Copolymerization was done in the presence of stereospecificity additive as defined above, in this case oxathiane, used in a molar ratio of titanium compound to oxathiane of 15, or in the presence of stereospecificity additive and activator as defined above, in this case oxathiane and diphenylacetylene, each used in a molar ratio of titanium compound to additive or activator of 30, or without any stereospecificity additive or activator, for purposes of comparison. Additive or additive and activator were injected after being mixed with the titanium compound as described in Example 11.

When stereospecificity additive was used alone, the reaction produce 32 g propylene and 4-methyl 1-pentene copolymer containing 7% weight of 4-methyl 1-pentene, and with an ether extraction residue of 97.9% and n-heptane extraction residue of 92.2% of gross copolymer weight.

When stereospecificity additive and activator were used together, the reaction produced 36 g copolymer, containing 7.4% weight of 4-methyl 1-pentene, and with an ether extraction residue of 96.8% and n-heptane extraction residue of 91.9% of the gross copolymer weight.

When performed without stereospecificity additive or activator, the reaction produced 38 g copolymer containing 6.6% weight of 4-methyl 1-pentene, with an ether extraction residue of 92.1% and n-heptane extraction residue of 88% of the gross copolymer weight.

Naturally, this invention is in no way confined to the Examples and embodiments described above; many variant forms are possible for semeone skilled in the art, depending on applications, and without any departure from the spirit of the invention.

What is claimed is:

1. In a process for producing polymers or copolymers of alpha-olefins containing from 3 to 8 carbon atoms with a high isotacticity index, by homopolymerization of an alpha-olefin containing 3 to 8 carbon atoms, sequence copolymerization of such alpha-olefins with one another and/or with ethylene, or copolymerization of mixtures of such alpha-olefins with one another and/or with ethylene, such mixtures containing at least 85 moles percent of one such alpha-olefin, using a catalyst containing a titanium chloride and an organic aluminum compound, in the presence of a stereospecificity additive, the improvement which comprises using as the stereospecificity additive a compound of the formula:

$$R_1-O-(C_pH_{2p})-S-R_2,$$

where:
p is an integer from 1 to 6,
R₁ and R₂ are identical or different alkyl radicals containing 1 to 4 carbon atoms, or are linked together to form a divalent—($C_mH_{2m}$)—radical,
where: m is an integer from 1 to 6.

2. A process according to claim 1, in which the stereospecificity additive has the formula:

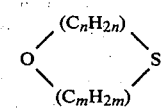

wherein m and n are the same or different integers and are equal in value from 1 to 4.

3. A process according to claim 1 or 2, in which the organic aluminum compound in the catalyst has the general formula:

$$Al\ Y_a\ X\ (3-a),$$

wherein
Y is an alkyl radical containing 1 to 8 carbon atoms, a cycloalkyl radical containing 4 to 8 carbon atoms, or an aryl radical containing 6 to 8 carbon atoms,
X is a halogen atom, and a is a number 1, 1.5, 2 or 3.

4. A process according to claim 3, wherein the organic aluminum compound in the catalyst is selected from the group of compounds of the formula:

$$Al\ Y_2\ Cl\ and\ Al\ Y_3,$$

wherein
Y is an alkyl radical containing 1 to 8 carbon atoms, a cycloalkyl radical containing 4 to 7 carbon atoms, or an aryl radical containing 6 to 8 carbon atoms.

5. A process according to claim 4 wherein Y is an alkyl radical containing 2 to 6 carbon atoms and the cycloalkyl radical contains 4 to 7 carbon atoms.

6. A process according to claim 5 wherein the cycloalkyl radical is cyclohexyl.

7. A process according to claim 4 wherein the aryl radical is phenyl.

8. A process according to claim 1 or 2, in which the titanium chloride is titanium trichloride.

9. A process as defined in claim 8, in which the titanium chloride is obtained by reduction of titanium tetrachloride with aluminum or titanium.

10. A process according to claim 9 wherein the reduced product is crushed.

11. A process according to claim 8 wherein the titanium trichloride is obtained by reduction of titanium tetrachloride by hydrogen or an organometallic compound.

12. A process according to claim 11 wherein the organometallic compound is an alkyl aluminum.

13. A process according to claim 8, wherein the titanium trichloride is obtained by grinding a mixture of titanium trichloride and a halide of a metal in column III of the Periodic Table of Elements.

14. A process according to claim 13, wherein the metal halide is an aluminum halide.

15. A process according to claim 8 wherein the titanium trichloride is modified by being treated with a compound selected from the group consisting of a tertiary amine, camphor, a dialkyl ether, and a phosphorus compound.

16. A process according to claim 15 wherein the phosphorus compound is phosphorus oxychloride.

17. A process according to claim 1 or 2, wherein the catalyst is deposited on or fixed to an inorganic or organic substrate.

18. A process according to claim 1 or 2 wherein the ratio of the number of titanium atoms to the number of additive molecules in the polymerization mixture is between 0.01 and 100.

19. A process according to claim 18 wherein the ratio of the number of titanium atoms to the number of additive molecules in the polymerization mixture is between 1 and 70.

20. A process according to claim 1 or 2, wherein the catalyst containing titanium chloride and the organic aluminum compound is preformed before being injected into the polymerization mixture, and the stereospecificity additive is injected into this mixture either mixed with the preformed catalyst or separately.

21. A process according to claim 1 or 2, wherein the titanium chloride and organic aluminum compound together forming the catalyst are injected separately into the polymerization mixture, and the stereospecificity additive is injected into this mixture either separately from the catalyst components or mixed with either the titanium chloride or the organic aluminum compound before they are injected.

22. A process according to claim 1 or 2, wherein in addition to the stereospecificity additive, the polymerization mixture contains one or more activators, selected from the group consisting of acyclic and cyclic polyenes and dihydrocarbylacetylenes in which the hydrocarbyl radicals are selected from the group consisting of aryl radicals containing 6 to 16 carbon atoms, and alkyl radicals containing 1 to 16 carbon atoms.

23. A process according to claim 22 wherein the aryl radicals contain 6 to 18 carbon atoms.

24. A process according to claim 22 wherein the alkyl radicals contain 1 to 8 carbon atoms.

25. A process according to claim 22 wherein the ratio of the number of titanium atoms to the number of molecules of activator in the polymerization mixture is between 0.01 and 100.

26. A process according to claim 25 wherein the ratio of the number of titanium atoms to the number of molecules of activator in the polymerization mixture is between 1 and 70.

27. A process according to claim 22, wherein the relative proportions of stereospecificity additive and activator are such that the ratio of the number of additive molecules to the number of activator molecules is between 0.2 and 5.

28. A process according to claim 27 wherein the ratio of the number of additive molecules to the number of activator molecules is between 0.5 to 2.

29. A process according to claim 22 wherein the activator is added to the polymerization mixture either separately or mixed with the stereospecificity additive.

* * * * *

UNITED STATES PATENT OFFICE
CERTIFICATE OF CORRECTION

Patent No. 4,228,252     Dated     October 14, 1980

Inventor(s)     Gilbert Marie

It is certified that error appears in the above-identified patent and that said Letters Patent are hereby corrected as shown below:

Column 3, line 35:   "collumn" should be --column--.

Column 5, line 28:   "hexene" should be --hexane--.

Column 8, line 8:    "quantitites" should be --quantities--.

Column 10, line 56:  "additve" should be --additive--.

Column 15, line 62:  "lever" should be --level--.

Column 19, line 68:  "semeone" should be --someone--.

Signed and Sealed this

Thirty-first Day of March 1981

[SEAL]

Attest:

RENE D. TEGTMEYER

Attesting Officer     Acting Commissioner of Patents and Trademarks